(12) United States Patent
Liu

(10) Patent No.: US 10,719,605 B2
(45) Date of Patent: Jul. 21, 2020

(54) METHOD FOR DYNAMICALLY CONTROLLING APPLICATION FUNCTION BASED ON ENVIRONMENT DETECTION

(71) Applicant: CHINA UNIONPAY CO., LTD., Shanghai (CN)

(72) Inventor: Fazhang Liu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 176 days.

(21) Appl. No.: 15/518,340

(22) PCT Filed: Oct. 6, 2015

(86) PCT No.: PCT/CN2015/091424
§ 371 (c)(1),
(2) Date: Apr. 11, 2017

(87) PCT Pub. No.: WO2016/062193
PCT Pub. Date: Apr. 28, 2016

(65) Prior Publication Data
US 2017/0308702 A1    Oct. 26, 2017

(30) Foreign Application Priority Data
Oct. 22, 2014    (CN) .......................... 2014 1 0565859

(51) Int. Cl.
*G06F 21/00*    (2013.01)
*G06F 21/56*    (2013.01)
(Continued)

(52) U.S. Cl.
CPC ............ *G06F 21/566* (2013.01); *G06F 21/51* (2013.01); *G06F 21/561* (2013.01); *H04W 12/12* (2013.01); *H04W 12/00505* (2019.01)

(58) Field of Classification Search
CPC ...... G06F 21/51; G06F 21/561; G06F 21/566; H04W 12/12
See application file for complete search history.

(56) References Cited

U.S. PATENT DOCUMENTS 7,835,721 B2    11/2010    Tuulos et al.
8,495,747 B1 *    7/2013    Nakawatase .......... G06F 21/577
726/25

(Continued)

FOREIGN PATENT DOCUMENTS

CN    1547364 A    11/2004
CN    101753554 A    6/2010
(Continued)

*Primary Examiner* — Joseph P Hirl
*Assistant Examiner* — Ka Shan Choy
(74) *Attorney, Agent, or Firm* — The Ollila Law Group LLC

(57) ABSTRACT

The invention discloses a method of dynamically controlling application function at the client, comprising: initiating an application program which merely contains framework function codes; loading a security module after initiating the application program, wherein the security module sends a request regarding scanning configuration file to a server; scanning the application environment of the client according to the configuration file received from the server, and sending the result of scanning to the server so as to generate a risk score; and receiving the function codes that are allowed to be loaded in the current application environment from the server, wherein the function codes are generated by the server based on the generated risk score. The invention also discloses a method of dynamically controlling application function at a server.

10 Claims, 1 Drawing Sheet

(51) Int. Cl.
*G06F 21/51* (2013.01)
*H04W 12/12* (2009.01)
*H04W 12/00* (2009.01)

(56) References Cited

U.S. PATENT DOCUMENTS

| | | | |
|---|---|---|---|
| 2005/0022028 A1* | 1/2005 | Hall | G07F 17/0014 726/4 |
| 2008/0285758 A1 | 11/2008 | Chuprov et al. | |
| 2008/0301796 A1 | 12/2008 | Holostov et al. | |
| 2010/0138925 A1* | 6/2010 | Barai | H04L 63/1433 726/25 |
| 2010/0332236 A1 | 12/2010 | Tan | |
| 2013/0097710 A1* | 4/2013 | Basavapatna | H04W 4/02 726/25 |
| 2013/0227636 A1 | 8/2013 | Bettini et al. | |
| 2013/0227683 A1 | 8/2013 | Bettini et al. | |
| 2013/0246604 A1 | 9/2013 | Pham | |
| 2014/0222955 A1* | 8/2014 | Islam | H04L 63/0876 709/217 |
| 2014/0359777 A1* | 12/2014 | Lam | G06F 21/577 726/25 |
| 2016/0300076 A1 | 10/2016 | Hu et al. | |

FOREIGN PATENT DOCUMENTS

| | | |
|---|---|---|
| CN | 102760219 A | 10/2012 |
| CN | 102768743 A | 11/2012 |
| CN | 103379112 A | 10/2013 |
| CN | 103440168 A | 12/2013 |
| CN | 103577750 A | 2/2014 |
| CN | 103973679 A | 8/2014 |
| EP | 2609538 B1 | 10/2016 |
| TW | 200847019 A | 12/2008 |

* cited by examiner

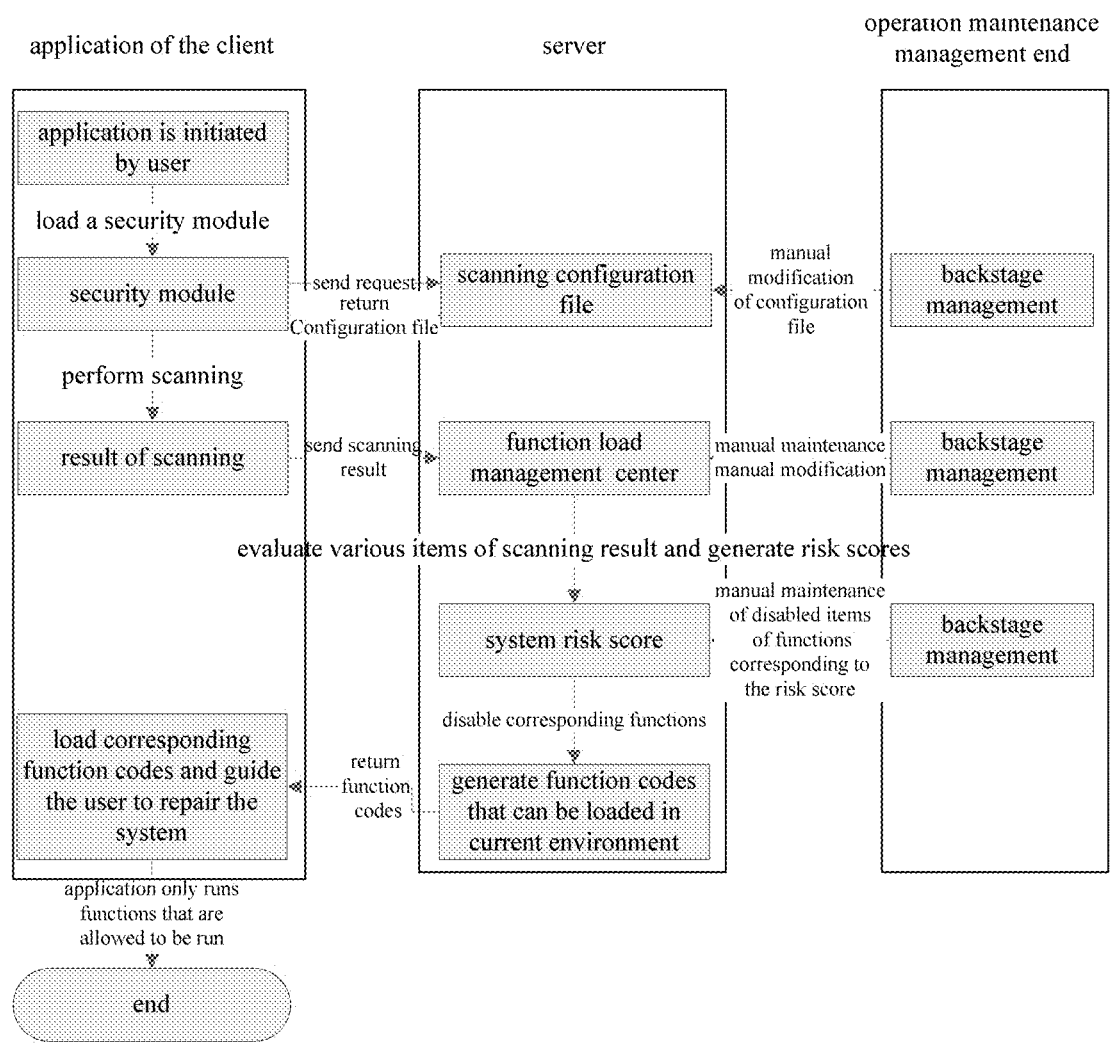

METHOD FOR DYNAMICALLY CONTROLLING APPLICATION FUNCTION BASED ON ENVIRONMENT DETECTION

FIELD OF THE INVENTION

The invention relates to a method of dynamically loading application functions, and more specifically, to a dynamic application function control method based on environment detection.

BACKGROUND

Currently, on the Android platform, users are being faced with severe security threats, and viruses, bugs, wooden horses or the like are significantly affecting the security of applications, especially payment applications. At present, various Android clients have a certain self-protection function which, however, is still limited to the thought of increasing the complexity of applications and improving the difficulty in cracking. For a known unsafe environment, no fundamental protection is provided.

SUMMARY OF THE INVENTION

In order to solve the above problems, the applications provides a method of detecting the environment of the mobile platform and dynamically loading application function according to the result of environment detection, wherein for the applications that are relatively sensitive such as those relating to privacy, transaction or the like, the security of environment is firstly detected, the current environment is rated according to the detection, and an application function corresponding to the rate is loaded; if the environment is determined to be dangerous, the loading of the functions relating to financial transactions, payment or the like will be rejected and the user will be informed to clean the environment, so as to ensure the security of applications.

According to one aspect of the application, a method of dynamically controlling application function at the client is provided, comprising: initiating an application program which merely contains framework function codes; loading a security module after initiating the application program, wherein the security module sends a request regarding scanning configuration file to a server; scanning the application environment of the client according to the configuration file received from the server, and sending the result of scanning to the server so as to generate a risk score; and receiving the function codes that are allowed to be loaded in the current application environment from the server, wherein the function codes are generated by the server based on the generated risk score.

In the above method, the application program has one or more functions, and wherein, when there is risk in the application environment of the client, one or more of all the functions of the application program are disabled.

In the above method, when there is risk in the application environment of the client, the user is guided to repair the system.

In the above method, the scanning configuration file is updated or maintained regularly by an operation maintenance management end.

In the above method, when the generated risk score is larger than a first threshold and smaller than a second threshold, a first function of the application program is disabled, and when the generated risk score is larger than the second threshold and smaller than a third threshold, the first function and a second function of the application program are disabled.

According to another aspect of the application, a method of dynamically controlling application function at a server is provided, comprising: receiving a request from a security module of a client, the request being relevant to providing scanning configuration file; returning the configuration file according to the request so as to cause the client to perform the scanning; receiving the result of scanning from the client and evaluating the result so as to generate a risk score; determining the part of the functions of the application program that needs to be disabled according to the result of scanning and the generated risk score; and generating function codes that are adapted to the current application environment based on the determined result, and sending the result to the client such that it can be loaded by the client.

In the above method, the application program has one or more functions, and wherein, when there is risk in the application environment of the client, one or more of all the functions of the application program are disabled.

In the above method, when there is risk in the application environment of the client, the user is guided to repair the system.

In the above method, the scanning configuration file is updated or maintained regularly by an operation maintenance management end.

In the above method, when the generated risk score is larger than a first threshold and smaller than a second threshold, a first function of the application program is disabled, and when the generated risk score is larger than the second threshold and smaller than a third threshold, the first function and a second function of the application program are disabled.

In the above method, the application environment of the client is Android.

BRIEF DESCRIPTION OF THE DRAWINGS

After reading the specific embodiments of the invention with reference to the accompanying drawings, those skilled in the art will understand various aspects of the invention more clearly. It should be understood by those skilled in the art that these drawings are merely provided for explaining the technical solutions of the invention in connection with specific embodiments, and are not intended for limiting the scope of protection of the invention.

FIG. 1 is a schematic view of the dynamic application function control method based on environment detection according to an embodiment of the application.

DETAILED DESCRIPTION OF THE INVENTION

Some of a plurality of possible embodiments of the invention will be described below with the purpose of providing a basic understanding of the invention rather than identifying key elements or crucial elements of the invention or limiting the scope of protection. It can be easily understood that according to the technical solution of the invention, those skilled in the art can propose other implementations that can be replaced with each other without departing from the true spirit of the invention. Therefore, the following specific embodiments and drawings are merely exemplary description of the technical solutions of the invention, and should not be considered as the entirety of the invention or as limitation or restriction of the technical solutions of the invention.

As described in the background section, currently, the protective measures of various Android clients are limited to the thought of increasing the complexity of applications and improving the difficulty in cracking, and for a known unsafe environment, no fundamental protection is provided.

In order to solve this problem, the application has the following basic concept: if the known current environment may have a threat and is unsafe, relevant important functions will be disabled, services to the user will be rejected, and the user is informed to update or repair the system before use. This method increases the security at the cost of losing certain user's experiences, thus ensuring the security of transaction.

With reference to FIG. 1, in a specific embodiment, an application program is firstly initiated by the user, which application merely contains framework function codes. Next, the application loads a security scanning module which sends a request regarding scanning configuration file to a server (the configuration file designates configuration information relating to scanning, such as detection target, detection manner, etc.). Then, the server receives the application's request and reads a local configuration file (which can be modified by operational personnel through a backstage management page) and returns it to the client application.

The content of the configuration file can be exemplified as follows:

1) is there root in the system? (if there is root, it means that relevant data may be maliciously read in the application);

2) is there user-trusted certificate in the system? (when the user is connected to an external WIFI, there may exist HTTPS deceit);

3) is there known bug that affects security in the current edition of system? (if there is known bug, the user should be prompted to update and shut down relevant functions that are affected by the bug);

4) is there malicious APP in the system? (malicious APP may read information such as transaction messages, and prompt user to unload relevant APP);

5) is the application in the newest edition? (the original edition of the application may have relevant bug and prompt user to update, and the risk score is changed according to the edition);

6) is the system connected to WIFI? (when the user is connected to WIFI, there may exist fishing, which may be taken as a comprehensive consideration item);

7) is there unknown APP in the system? (the unknown APP in the system may be malicious, and may be taken as a comprehensive consideration item);

After the scanning configuration file is received from the server, the security module scans and detects the system according to the scanning configuration file, and generates a scanning result. Then, the client sends the scanning result to the server, which evaluates the scanning results of various items according to current rules of the backstage (herein, the rules can be dynamically adjusted by maintenance personnel via a backstage management interface) and generates risk scores. In a specific example, the rules are exemplified as follows:

| Risk item | Risk score |
| --- | --- |
| there is unknown certificate in the system | +30 |
| the system is connected to WIFI, and the presence of intermediary is detected | +50 |

-continued

| Risk item | Risk score |
| --- | --- |
| there is malicious APP in the system | +50 |
| there is known bug in the current edition of application | +10 |
| the system has root, but there are no other risk items | +10 |
| there is unknown APP in the system | +20 |
| the system has root and there is unknown APP | +50 |

Next, the server disables relevant functions according to the scanning results and risk scores. It is assumed that the current application has five functions of logging in, inquiring, purchasing products, intra-bank transferring and inter-bank transferring. In case of considering the risk scores, when the risk score is larger than 20, "inter-bank" transferring is disabled; when the risk score is larger than 40, the "transferring" function is disabled; when the risk score is larger than 60, the "purchasing" function is disabled; and when the risk score is larger than 80, the "inquiring" function is disabled. In an embodiment, other disabled items of function are required to be additionally designated. For example, when the "purchasing" function of a certain edition is known to have bugs, other functions are normal. In a further example, when the edition reported by a certain client has bugs, although the risk score is not high at this time, the "purchasing" function has to be disabled. In this situation, the risk score corresponding to the bug edition can not be rised, since other functions can be normally used. Those skilled in the art can understand that which functions are to be disabled can be dynamically adjusted according to the current security situation.

Subsequently, according to the function-disabling situation, the server dynamically generates loadable function codes for the client's running. When the client receives the function codes, it loads and runs the codes, and for functions that are disabled, since there are no relevant codes, corresponding functions cannot be executed. Preferably, the client can guide the user to repair the system according to the risk scores.

As compared to the prior art, in the present invention, the applications can clearly know the current running environment's security threats to payment and transactions. The applications can effectively load or disable relevant functions, and reduce risks caused by environment threats. The backstage server can dynamically adjust strategy and modify loaded function items of the application, according to the newest security trend change. For example, the current Android 4.4.1 is the mainstream edition, and is relatively safe. However, when it comes to 2017, the Android 4.4.1 edition may have more security bugs revealed, and an un-updated system has problems that affect the security of transaction. The backstage can appropriately disable relevant functions. For example, only inquiring is allowed, and transferring is not allowed, thus reducing transaction risks. The application can purposefully guide the user to repair the system, thus improving the security. In addition, the technical solutions of the application can also consider collecting the security statuses of various systems in the current area for subsequent product design, product development, product promotion, security research, etc.

In the above, the specific embodiments of the invention have been described with reference to the accompanying drawings. However, those skilled in the art will understand that, various modifications and replacements can be also

The invention claimed is:

1. A method of dynamically controlling application function at a client, comprising:
    initiating an application program which only contains framework function codes;
    loading a security module after initiating the application program, wherein the security module sends a request regarding scanning configuration file to a server;
    receiving the scanning configuration file from the server;
    scanning the application environment of the client according to the scanning configuration file received from the server, and sending the result of scanning to the server so as to generate a risk score; and
    receiving function codes that are allowed to be loaded in the current application environment from the server, wherein the function codes are generated by the server based on the generated risk score, and the function codes that are allowed to be loaded are different from the framework function codes;
    wherein the scanning configuration file comprises at least one of: 1) is there root in a system of the client, and 2) is there a user-trusted certificate in the system of the client.

2. The method according to claim 1, wherein the application program has one or more functions, and wherein, when there is risk in the application environment of the client, one or more of all the functions of the application program are disabled.

3. The method according to claim 2, wherein when the generated risk score is larger than a first threshold and smaller than a second threshold, a first function of the application program is disabled, and when the generated risk score is larger than the second threshold and smaller than a third threshold, the first function and a second function of the application program are disabled.

4. The method according to claim 1, wherein when there is risk in the application environment of the client, the user is guided to repair the system.

5. The method according to claim 1, wherein the scanning configuration file is updated or maintained regularly by an operation maintenance management end.

6. A method of dynamically controlling application function at a server, comprising:
    receiving a request from a security module of a client, the request being relevant to providing scanning configuration file;
    returning the scanning configuration file according to the request such that the scanning can be performed by the client;
    receiving the result of scanning from the client and evaluating the result so as to generate a risk score;
    determining the part of the functions of the application program that needs to be disabled according to the result of scanning and the generated risk score; and
    generating function codes that are adapted to the current application environment of the client based on the determined result, and sending the function codes to the client such that they can be loaded by the client, wherein the function codes does not exist in the client before this step; and
    wherein the scanning configuration file comprises at least one item of: 1) is there root in a system of the client, and 2) is there a user-trusted certificate in the system of the client.

7. The method according to claim 6, wherein the application program has one or more functions, and wherein, when there is risk in the application environment of the client, one or more of all the functions of the application program are disabled.

8. The method according to claim 6, wherein when there is risk in the application environment of the client, the user is guided to repair the system.

9. The method according to claim 6, wherein the scanning configuration file is updated or maintained regularly by an operation maintenance management end.

10. The method according to claim 7, wherein when the generated risk score is larger than a first threshold and smaller than a second threshold, a first function of the application program is disabled, and when the generated risk score is larger than the second threshold and smaller than a third threshold, the first function and a second function of the application program are disabled.

* * * * *